Aug. 17, 1926.
J. KOIVISTO
CULTIVATING TOOL
Filed Jan. 8, 1923
1,596,106
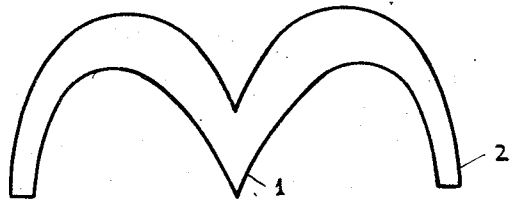
*Fig. 1.*
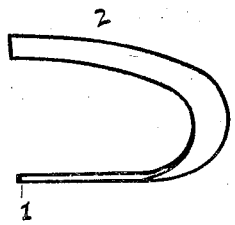
*Fig. 2.*
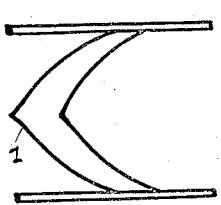
*Fig. 3.*
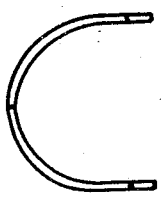
*Fig. 4.*
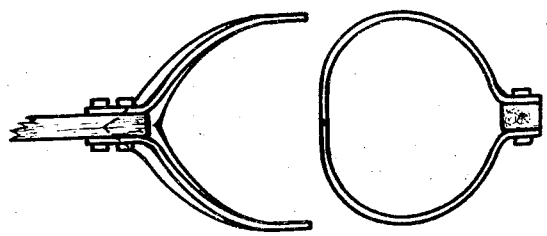
*Fig. 3ª.*   *Fig. 4ª.*
Inventor:
Jooseppi Koivisto
By
Attorney Patented Aug. 17, 1926.

1,596,106

UNITED STATES PATENT OFFICE.

JOOSEPPI KOIVISTO, OF NURMIJARVI, FINLAND.

CULTIVATING TOOL.

Application filed January 8, 1923, Serial No. 611,350, and in Germany December 9, 1922.

The present invention relates to an improved cultivating tool for loosening the soil, which can be used with equal facility as a hoe, a plow share, or a harrow tooth; and its object, stated briefly, is to provide a tool of the character indicated embodying a central point and a pair of vertical wings at opposite sides thereof, so arranged that the soil, instead of being thrown to one side, passes between the aforesaid wings, with the result that less power is expended in operating the tool than has heretofore been required.

In the accompanying drawing:

Figure 1 is a plan view of the blank from which the improved cultivating tool is constructed;

Fig. 2 is a side view of the tool in completed form;

Fig. 3 is a plan view of Fig. 2;

Fig. 3$^a$ is a view somewhat similar to Fig. 3, but showing the wings brought together and fastened to a handle, to enable the tool to be used as a hoe;

Figs. 4 and 4$^a$ are front views of Figs. 3 and 3$^a$, respectively.

The improved tool is constructed from a sheet steel or iron blank having somewhat the shape of the letter M, as illustrated in Fig. 1, which blank comprises a central V-shaped or chevron-shaped portion 1 and two curved outer portions or legs 2. The portion 1 is sharpened along its outer edges and forms the point of the tool, while the outer portions 2 serve as wings and are sharpened along their inner edges. The last-named parts are bent upwardly and forwardly from the rear corners of the point 1, but the latter is left approximately flat or horizontal When the tool is used as a share or harrow tooth, the wings 2 are disposed in substantially vertical position and in spaced, parallel relation to each other and fastened to the plow or harrow frame, the tool thus having a somewhat U-shaped appearance when viewed from the front (Fig. 4); such arrangement causing the soil which is dug up and loosened by the point to pass between the wings during the forward movement of the tool. If the tool is to be used as a hoe, however, the upper ends of the wings are brought together and fastened to the opposite side faces of a suitable handle; and in that event, the tool will have the appearance of a closed loop or circle in front elevation, as represented in Figs. 3$^a$ and 4$^a$. The wings, as well as the point, are more or less of skeleton form, and the said wings are sickle-shaped in side view—i. e., curve upwardly and forwardly like the blade of a sickle.

I claim as my invention:—

A cultivating tool, comprising an M-shaped metal blank having its legs forming a pair of side wings which are bent to curve upwardly from the corners of the point in the direction in which said point extends and are disposed in substantially vertical position.

In testimony whereof I have affixed my signature.

JOOSEPPI KOIVISTO.